(12) United States Patent
El-Eskandarany et al.

(10) Patent No.: US 10,364,148 B1
(45) Date of Patent: Jul. 30, 2019

(54) NANOCOMPOSITE SYSTEM FOR SOLID HYDROGEN STORAGE

(71) Applicant: KUWAIT INSTITUTE FOR SCIENTIFIC RESEARCH, Safat (KW)

(72) Inventors: Mohamed Sherif Mohamed Mostafa El-Eskandarany, Salmya (KW); Fahad Talal Mohammed Ali Salem Alajmi, Hadiya (KW); Mohammad E. A. A. Banyan, Abdullah Al-Mubarak (KW)

(73) Assignee: Kuwait Institute for Scientific Research, Safat (KW)

( * ) Notice: Subject to any disclaimer, the term of this patent is extended or adjusted under 35 U.S.C. 154(b) by 0 days.

(21) Appl. No.: 16/272,964

(22) Filed: Feb. 11, 2019

(51) Int. Cl.
*C01B 3/00* (2006.01)
*B22F 1/00* (2006.01)
(Continued)

(52) U.S. Cl.
CPC .......... *C01B 3/0078* (2013.01); *B22F 1/0018* (2013.01); *B22F 1/0044* (2013.01); *B22F 9/04* (2013.01); *B22F 2009/043* (2013.01); *B22F 2201/013* (2013.01); *B22F 2301/058* (2013.01); *B22F 2301/15* (2013.01);
(Continued)

(58) Field of Classification Search
CPC ........ C01B 3/0078; B22F 9/04; B22F 1/0018; B22F 1/0044; B22F 2999/00; B22F 2998/10; B22F 2302/25; B22F 2302/10; B22F 2301/058; B22F 2009/043; B22F 2301/15; B22F 2201/013; C01P 2002/72; C01P 2004/64; B82Y 30/00
See application file for complete search history.

(56) References Cited

U.S. PATENT DOCUMENTS 4,368,143 A  1/1983 de Pous
2009/0278086 A1\* 11/2009 Fruchart ................... B22F 9/04
                                                 252/182.33

FOREIGN PATENT DOCUMENTS

CN     102862958 A     1/2013
CN     103031481 A     4/2013
(Continued)

OTHER PUBLICATIONS

Debouche et al., "Effect of Activated Alloys on Hydrogen Discharge Kinetics of MgH2 Nanocrystals", Journal of Alloys and Compounds (2008), vol. 455, Issues 1-2, pp. 432-439.

*Primary Examiner* — Amber R Orlando
*Assistant Examiner* — Syed T Iqbal
(74) *Attorney, Agent, or Firm* — Richard C. Litman

(57) ABSTRACT

The nanocomposite system for hydrogen storage is a composite of $MgH_2$ powder with $ZrNi_5$ powder and a combination of $Nb_2O_5$, TiC and VC. Preferably, the $MgH_2$ is in nanocrystalline form and the $ZrNi_5$ is significantly in a Friauf-Laves phase. The nanocomposite system is formed by combining the $MgH_2$ powder with the $ZrNi_5$, $Nb_2O_5$, TiC and VC, preferably in amounts of 4 wt. % $ZrNi_5$+1 wt. % $Nb_2O_5$+0.5 wt. % TiC+0.5 wt. % VC, to form a mixture, and then performing reactive ball milling on the mixture. Preferably, the reactive ball milling is performed for a period of 50 hours.

6 Claims, 13 Drawing Sheets

(51) Int. Cl.
*B22F 9/04* (2006.01)
*B82Y 30/00* (2011.01)

(52) U.S. Cl.
CPC ....... *B22F 2302/10* (2013.01); *B22F 2302/25* (2013.01); *B22F 2998/10* (2013.01); *B22F 2999/00* (2013.01); *B82Y 30/00* (2013.01); *C01P 2002/72* (2013.01); *C01P 2004/64* (2013.01)

(56) References Cited

FOREIGN PATENT DOCUMENTS

| | | | |
|---|---|---|---|
| JP | 2004204309 A | 7/2004 | |
| JP | 2007330877 A | 12/2007 | |
| JP | 2008239367 A | 10/2008 | |
| JP | 2009132553 A | 6/2009 | |
| WO | WO-2009047011 A1 * | 4/2009 | ........... C01B 3/0078 |

* cited by examiner

NANOCOMPOSITE SYSTEM FOR SOLID HYDROGEN STORAGE

BACKGROUND OF THE INVENTION

1. Field of the Invention

The present invention relates to hydrogen storage, and particularly to a nanocomposite system for solid hydrogen storage that provides a mixture of magnesium hydride ($MgH_2$) doped with catalysts to improve the hydrogenation/dehydrogenation properties of magnesium hydride to make the hydride a more useful vehicle for solid hydrogen storage in hydrogen-based fuel systems.

2. Description of the Related Art

Hydrogen is a convenient, safe, and efficient fuel source that can be easily converted to a desired form of energy without releasing harmful emissions. Magnesium hydride ($MgH_2$) has been widely studied with regard to its use as a hydrogen storage medium due to its natural abundance, material and operational cost effectiveness, light weight and high hydrogen storage capacity.

$MgH_2$ readily reacts with water to form hydrogen gas: $MgH_2+2H_2O \rightarrow 2H_2\ Mg(OH)_2$. $MgH_2$ powders have been successfully produced near room temperature by reactive ball milling technique (RBM), using high-energy ball mills operated at hydrogen atmospheric pressure. However, due to the high thermal stability of $MgH_2$, the hydride releases little hydrogen at temperatures below 350° C. and exhibits prohibitively slow hydrogenation/dehydrogenation kinetics at temperatures less than 400° C. There is significant interest in improving the hydrogenation and dehydrogenation reaction kinetics of $MgH_2$. Prior efforts in improving the hydrogenation and dehydrogenation reaction kinetics of $MgH_2$ have not resulted in significant improvement, and/or have generally required the use of complex and costly additional machinery and equipment.

Thus, a nanocomposite system for solid hydrogen storage solving the aforementioned problems is desired.

SUMMARY OF THE INVENTION

The nanocomposite system for solid hydrogen storage includes a mixture of $MgH_2$ powder doped with a combination of $ZrNi_5$, $Nb_2O_5$, titanium carbide, and vanadium carbide. A method of making the mixture includes producing nanocrystalline $MgH_2$ powders using a reactive ball milling (RBM) technique. $ZrNi_5$ powders, preferably Friauf-Laves phase powders, are formed and combined with the nanocrystalline $MgH_2$ powders using RBM, along with a preferred combination of $Nb_2O_5$, TiC and VC, to form the nanocomposite system.

Preferably, the nanocomposite system for hydrogen storage includes $MgH_2$ with approximate amounts of 4 wt. % $ZrNi_5$, 1 wt. % $Nb_2O_5$, 0.5 wt. % TiC and 0.5 wt. % VC. The composition may include a composite powder including $MgH_2$ nanocrystalline powder and $ZrNi_5$ Friauf-Laves phase powder. The nanocomposite system for hydrogen storage is prepared by mixing $MgH_2$ powder and desired amounts of $ZrNi_5$, $Nb_2O_5$, TiC and VC powders to form a powdered mixture, and then performing reactive ball milling on the powdered mixture. Preferably, the reactive ball milling is performed at room temperature at 250 rpm for a period of 50 hours.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
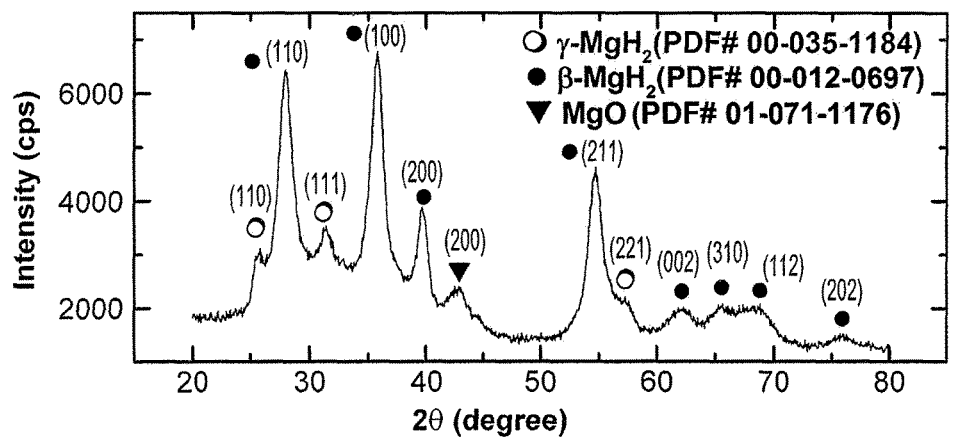
FIG. 1A is a plot showing the X-ray diffraction (XRD) pattern of nanocrystalline $MgH_2$ powders obtained after 200 h of reactive ball milling (RBM) time.

The nanocomposite system for solid hydrogen storage includes $MgH_2$ powder and a combination of $ZrNi_5$, $Nb_2O_5$, TiC and VC powders. The $ZrNi_5$ powder can be a Friauf- Laves phase powder. Preferably, the $ZrNi_5$ powder forms about 4 wt. % of the nanocomposite system for hydrogen storage. The $Nb_2O_5$, TiC, and VC powders preferably form about 1 wt. %, 0.5 wt. % and 0.5 wt. %, respectively. As will be described in greater detail below, the nanocomposite system for hydrogen storage is prepared by producing nanocrystalline $MgH_2$ powder using a reactive ball milling (RBM) technique. $ZrNi_5$ powder, preferably a Friauf-Laves phase powder, is formed and combined with the nanocrystalline $MgH_2$ powder using RBM, along with a preferred combination of $Nb_2O_5$, TiC and VC, to form the nanocomposite system. Preferably, the reactive ball milling is performed at room temperature at 250 rpm for a period of 50 hours.

The present inventors have found that combining $ZrNi_5$, $Nb_2O_5$, TiC and VC powders with $MgH_2$ powder as described herein improves the hydrogenation/dehydrogenation behavior of $MgH_2$. For example, the decomposition temperature at 1 bar in He of $MgH_2$ can be lowered from 60° C. when used in combination with $ZrNi_5$, $Nb_2O_5$, TiC and VC powders, as described herein (see FIG. 5, for example).

The following is a list of the starting materials and equipment used in the subsequent exemplary procedures. The Starting Materials include commercial magnesium (Mg) powder about 50 μm in diameter and 99.5 wt. % purity; sponge zirconium (Zr) metal with 99.5 wt. % purity; nickel (Ni) wires with 99.99 wt % purity; niobium pentoxide ($Nb_2O_3$) powders with 20 pm particle size and 99.9 wt. % purity; titanium carbide (TiC) powder with 10 μm particle size and 99.9 wt. % purity; vanadium carbide (VC) powder with 10 μm particle size and 99.9 wt. % purity; helium gas (He) cylinders having 99.999% purity (provided by a local gas company in Kuwait); and hydrogen gas ($H_2$) cylinders having 99.999% purity, (provided by a local gas company in Kuwait). The Equipment, Devices, and Tools include He-gas atmosphere-glove box (UNILAB Pro Glove Box Workstation, provided by mBRAUN, Germany); FeCr balls (11 mm in diameter) provided by Evico Inc, Germany; 220 ml volume hardened steel high pressure milling vial, provided by Evico Inc, Germany; Gas-Temperature-Monitoring System, provided by Evico Inc, Germany; and Planetary Ball Mill PM400, provided by Retsch, Germany.

Example 1

Synthesis of Nanocomposite System $MgH_2$ powder was prepared by sealing 5 g of magnesium (Mg) inside a hardened steel vial (220 mL volume) with 50 FeCr balls (~11 mm in diameter). The ball-to-powder weight ratio was 38:1. The atmosphere in the vial was evacuated to $10^{-3}$ bar pressure before introducing $H_2$ gas. The vial was filled with $H_2$ gas to reach a pressure of 50 bar. Reactive ball milling was then carried out at room temperature using the PM400 high energy ball mill. After 6, 12.5, 25, 50, 100 and 200 hours of reactive ball milling, the reaction was halted and a small amount (50 mg) of $MgH_2$ powder was then extracted in the glove box and sealed in vials. The as-reacted ball-milled powders obtained after different milling times were discharged into 8 Pyrex vials and kept under vacuum in a desiccator for further analysis.

To prepare $ZrNi_5$ Friauf-Laves phase powder, sponge Zr lumps with purity of 99.5% were purified by re-melting several times in He gas atmosphere in an arc-melter (AM type provided by Edmund Buhler GmbH, Germany) using an electric current of 450 A. The recovered Zr billets had purity of 99.999% and were rinsed with pure acetone and then ethanol before drying in an electric oven at 220° C. overnight. Proper amounts of Zr and Ni wires (provided by Alfa Aesar—USA, with purity of 99.99% and diameter of about 3 mm) were measured out to give the nominal composition of $ZrNi_5$, and then placed into a Cu-hearse mounted in the arc-melter. The Zr and Ni were melted under He gas atmosphere (99.999%). The melting process was preceded melting of pure Zr getter to remove the residual gas from the arc-melter's chamber. To ensure the compositional homogeneity of the obtained alloy, the pre-alloyed button was overturned, and the composition was re-melted six times at an electric current ranging between 300 A to 350 A, resulting in a final alloy button.

The alloy button was polished by a SiC abrasive (grade P-80), rinsed with diluted acetone solution, and then dried at 220° C. for about 12 h in a drying furnace to give a master alloy. The master alloy was crushed into irregular small pieces (~10 mm-60 mm) by a 60-ton cold press and then disintegrated into coarse particles (~50 μm) using a vibratory disc mill (RS-200, provided by RETSCH, Germany) at a speed of 1500 rpm for 30 s. The disintegrated material particles were then sieved to separate fine powder particles (under 75 μm) from coarse granular materials (above 75 μm). The size of the as-synthesized $ZrNi_5$ particles was reduced by subjecting them to a continuous high-energy ball milling for 10 h (SPEX 8000 Shaker/Mill provided by SPEX SamplePrep Company, USA). The as-milled $ZrNi_5$ powder consisted of fine nanocrystals less than approximately 200 nm in diameter.

To prepare the nanocomposite powder, the prepared $MgH_2$ powder was mixed with the $ZrNi_5$, $Nb_2O_5$, TiC and VC powders in the helium gas atmosphere glove box using an agate mortar and pestle. Specifically, the following data reflects the nanocomposite formed by mixing about 4.70 g $MgH_2$, 0.2 g $ZrNi_5$, 0.05 g $Nb_2O_5$, 0.025 g TiC and 0.025 g VC. The mixture was then sealed in a hardened steel vial with 50 hardened steel balls under a helium gas atmosphere. The milling process was carried out at room temperature using the high energy planetary ball mill (RETSCH, PM400, Germany) operated at a rotation speed of 250 rpm. In order to investigate the effect of the ball milling time on the morphological properties of the powders, the milling procedure was interrupted after selected times of 12.5 h, 25 h, 37.5 h and 50 h), at which point a small amount (250-300 mg) of the powder was discharged in the He gas glove box.

Example 2

Structural Characterization of the Nanocomposite Powder

The crystal structure of each sample was investigated by X-ray diffraction (XRD) with CuKα radiation using a 9 kW X-ray diffraction system (Smartlab-Rigaku, Japan). The local structure of the synthesized material powders was studied by 200 kV-field emission high resolution transmission electron microscopy/scanning transmission electron microscopy (HRTEM/STEM; JEOL-2100F, Japan). Energy-dispersive X-ray spectroscopy (EDS) was performed using a system supplied by Oxford Instruments, UK. Thermal analysis was performed by differential scanning calorimetry (Shimadzu Thermal Analysis System/TA-60WS) to investigate the decomposition temperatures of the nanocomposite powder (with a heating rate of 20° C./min).

Different DSC experimental sets were performed for different heating rates of 2° C./min, 5° C./min, 10° C./min, 20° C./min and 30° C./min, and the activation energy (Ea) of decomposition was calculated using the Arrhenius equation (Eq. 1):

$$E_a = -RT \ln(k) \quad (1)$$

where k is a temperature-dependent reaction rate constant, R is the gas constant, and T is the absolute temperature. The value $E_a$ of the reaction was determined by measuring the decomposition peak temperature (Tp) corresponding to the respective heating rates and then plotting ln(k) versus 1/Tp. The high pressure DSC (HPDSC) (Setaram Instrumentation, France) was employed using 30 bar of hydrogen gas atmosphere for the different heating rates in order to determine the activation energy of hydrogenation.

Hydrogen absorption/desorption kinetics were investigated using Sievert's method under a hydrogen gas pressure ranging between 200 mbar and 8 bar. Samples were examined at differing temperatures of 50° C., 100° C., 150° C., 250° C., and 275° C.

Example 3

Results of Exemplary Procedures and Analyses

Figure 1B:
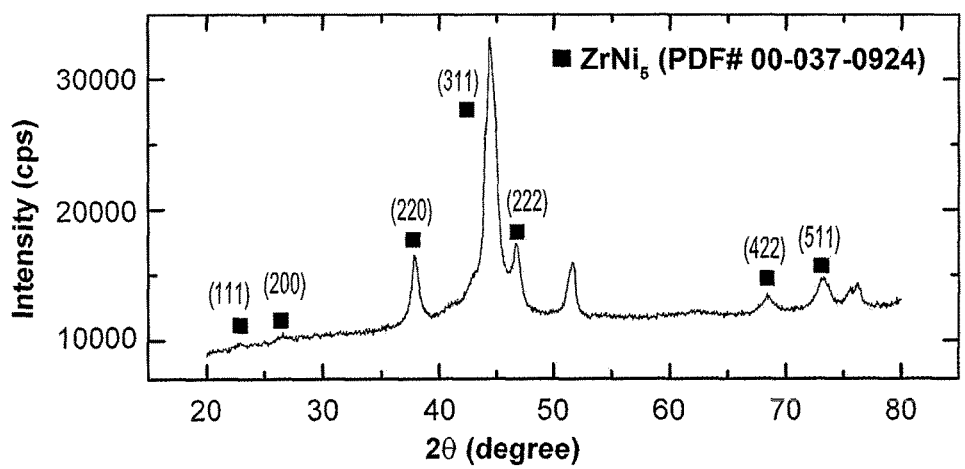
FIG. 1B is a plot showing the X-ray diffraction (XRD) pattern of $ZrNi_5$ powders obtained by arc melting after 10 h of ball milling time.

FIGS. 1A and 1B show the X-ray diffraction (XRD) patterns for the $MgH_2$ (before doping) and $ZrNi_5$ powders synthesized as described above obtained after 200 and 10 h of ball milling, respectively. The $MgH_2$ powder XRD pattern is consistent with a powder of mostly tetragonal phase of β-$MgH_2$ (PDF file#: 00-012-0697), as indicated by the Bragg peaks appearing at 2θ of 27.97°, 35.78°, 39.73°, and 54.73° (FIG. 1A). Minor Bragg peaks at 2θ of 25.73°, 31.30° and 44.56° suggest the tetragonal phase coexists with a small volume fraction of orthorhombic metastable phase of y-$MgH_2$ (PDF file#: 00-035-1184). The Bragg peak at 2θ of 44.46° suggests slight FeCr alloy contamination of ~2.25 wt. %. The Bragg peak at 2θ of ~42° suggests the formation of fcc-MgO (PDF file#: 00-071-1176) through oxidation of the $MgH_2$ powder, likely during handling outside the glove box for preparation of x-ray analysis. The $ZrNi_5$ powder XRD pattern evinces Miller-indexed Bragg peaks consistent with Friauf-Laves phase $ZrNi_5$ (PDF#: 00-037-0924). The breadth of the indicated peaks likely reflect grain refining of the powders during high-energy ball milling.

Figure 1C:
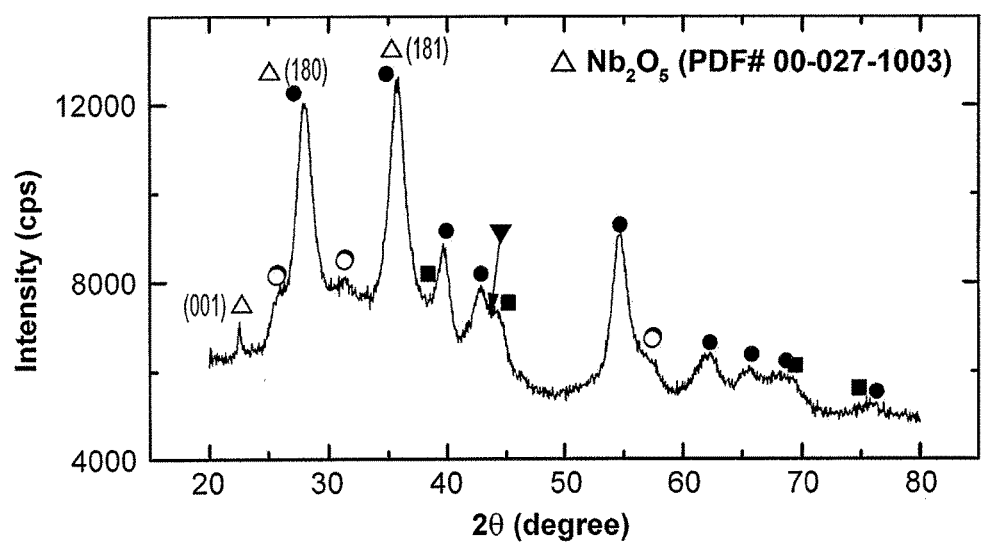
FIG. 1C is a plot showing the X-ray diffraction (XRD) pattern of $MgH_2$ doped with 4 wt. % $ZrNi_5$ and 1 wt. % $Nb_2O_5$+0.5 wt. % TiC+0.5 wt. % VC powder after 50 h of ball milling time.

FIG. 1C shows the XRD pattern of the exemplary nanocomposite powder ($MgH_2$ doped with 4 wt. % $ZrNi_5$ and 1 wt. % $Nb_2O_5$+0.5 wt. % TiC+0.5 wt. % VC powder) prepared as described in Example 1 and ball-milled for 50 hours. The Bragg peaks of the $MgH_2$ and $ZrNi_5$ powders remain, likely broadened due to formation of nanocrystalline powder particles. Neither starting material reactive phases (e.g., $ZrH_2$, NbH, etc.) nor foreign phases were evident from the XRD pattern, suggesting a nanocomposite consisting primarily of $MgH_2$, $ZrNi_5$ and $Nb_2O_5$ powders. The low concentration of TiC and VC contributed signals with amplitudes below noise level.

A high resolution transmission electron microscopy (HR-TEM) image of the exemplary nanocomposite powder obtained after ball milling a mixture 50 hours using a high-energy ball mill exhibited Moire-like fringes with nanocrystalline-structure containing crystallites ranging in size from approximately 5-12 nm. The lattice-fringe images reflect components of the nanocomposite powder matrix consistent with those discussed above, i.e., β-$MgH_2$ (101), $ZrNi_5$ (222), $Nb_2O_5$ (181), TiC (111) and VC (111).

The nanocomposite powder prepared after 50 hours of RBM was imaged by dark field image (DFI). Fourteen zones of the imaged sample were further imaged by FE-HRTEM and subjected to EDS analysis using a beam 2 nm in diameter. The corresponding elemental results are shown in Table 1.

TABLE 1

EDS analysis of nanocomposite powder at 14 zones selected from DFI image

| | Composition (wt. %) | | | | |
|---|---|---|---|---|---|
| Point | Mg | $ZiNi_5$ | $Nb_2O_5$ | TiC | VC |
| 1 | 94.1 | 4.3 | .9 | .4 | .3 |
| 2 | 93.2 | 4.4 | 1.3 | .6 | .5 |
| 3 | 94.5 | 3.8 | .8 | .5 | .4 |
| 4 | 94.4 | 3.9 | 1.2 | .3 | .2 |
| 5 | 94.9 | 3.4 | .9 | .3 | .5 |
| 6 | 94.8 | 3.8 | 1.0 | .1 | .3 |
| 7 | 95.0 | 4.1 | .7 | — | .1 |
| 8 | 94.6 | 3.7 | .8 | .6 | .3 |
| 9 | 94.8 | 3.8 | .9 | .2 | .3 |
| 10 | 95.1 | 3.7 | 1.0 | .2 | — |
| 11 | 94.8 | 3.6 | .9 | .4 | .3 |
| 12 | 94.9 | 3.9 | .7 | .3 | .2 |
| 13 | 95.1 | 3.7 | .8 | .2 | .2 |
| 14 | 94.6 | 3.8 | .9 | .3 | .4 |

Figure 2A:
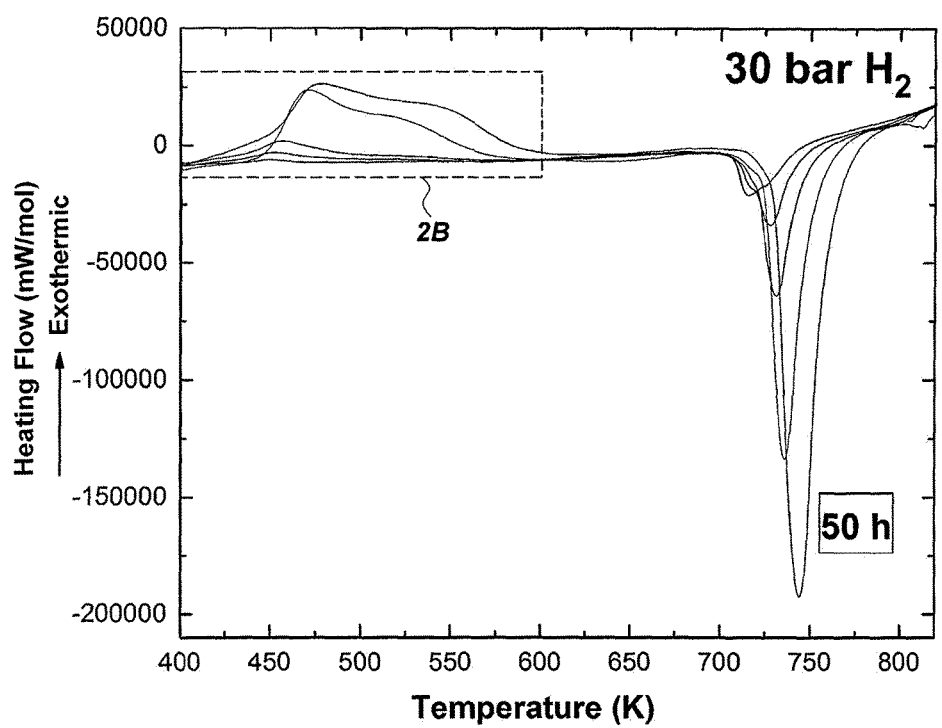
FIG. 2A is a plot of high-pressure differential scanning calorimetry (HPDSC) traces achieved under 30 bar hydrogen pressure at different heating rates shows hydrogenation/dehydrogenation behaviors and thermal stability of $MgH_2$ doped with 4 wt. % $ZrNi_5$ and 1 wt. % $Nb_2O_5$+0.5 wt. % TiC+0.5 wt. % VC powder after 50 h of ball milling time.
Figure 2B:
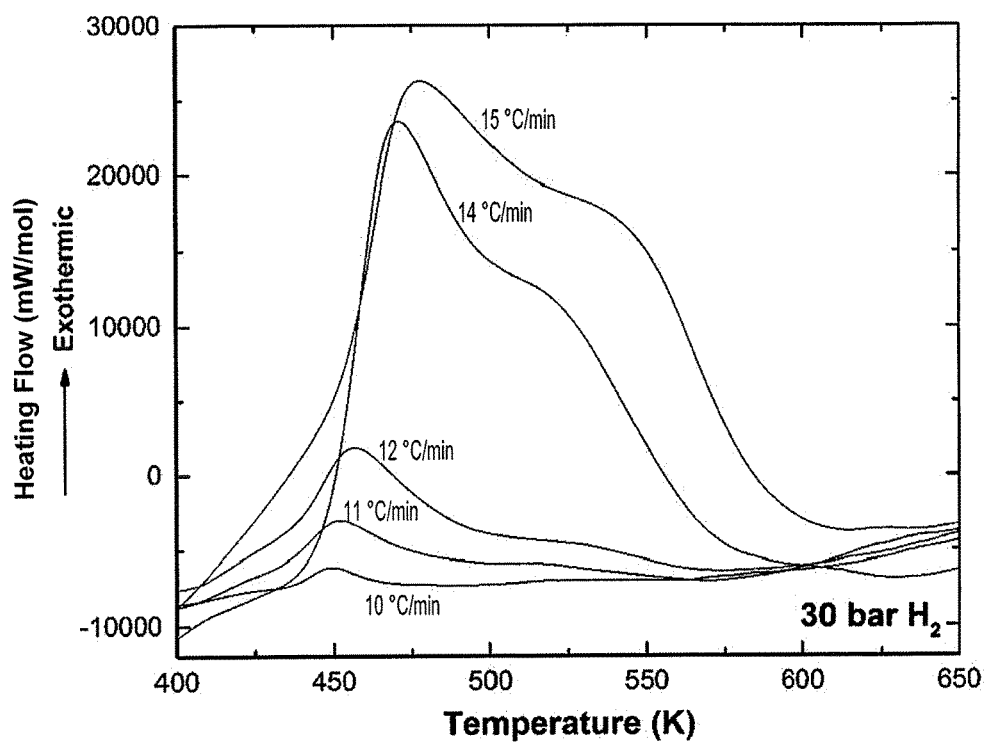
FIG. 2B is a detail view of area 2B of the HPDSC traces of FIG. 2A.

FIGS. 2A-2B show the results of differential scanning calorimetry (DSC) performed at high pressure (HP-DSC, 30 bar $H_2$ gas) and atmospheric pressure for various heating rates to determine the apparent activation energy ($E_a$) of hydrogenation and dehydrogenation of sample nanocomposite powders formed after different RBM times. The HP-DSC traces taken with different heating rates of 10, 11, 12, 14, 15° C./min for the nanocomposite powders obtained after 50 h of RBM time are shown together in FIG. 2A. All scans revealed exothermic peaks (low temperature peaks) related to hydrogenation occurring between hydrogen and metallic Mg in the $MgH_2$. The temperatures of the exothermic peaks fall in the range of 450° C.-482° C. for the applied heating rates (FIG. 2B). XRD analysis of the exemplary nanocomposite powders corresponding to these exothermic peaks confirmed the coexisting $MgH_2$, $ZrNi_5$ and $Nb_2O_5$ phases without any detectable reacted phases. Endothermic peaks appeared above 712° C., corresponding to decomposition of $MgH_2$ phase in the nanocomposite powder. XRD analysis of the samples taken after these endothermic reactions confirmed the decomposition of $MgH_2$ into metallic magnesium phase coexisting with $ZrNi_5$ and $Nb_2O_5$ phases.

Figure 2C:
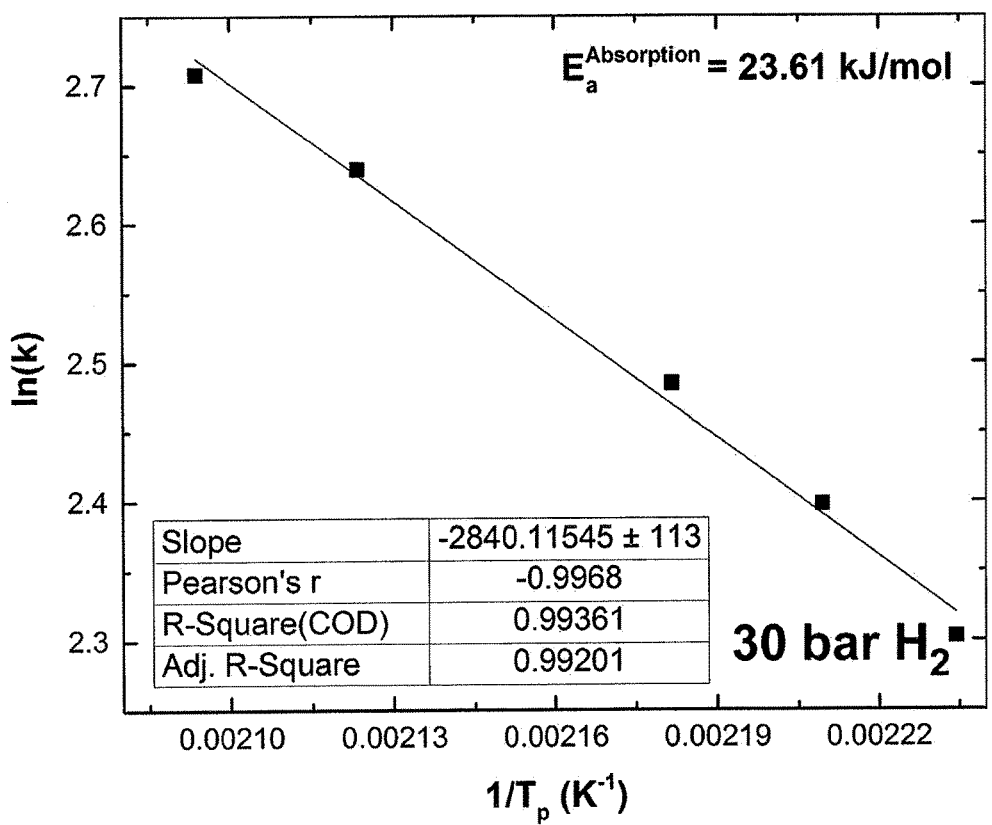
FIG. 2C is an Arrhenius plot derived from the hydrogenation peak temperatures shown in the detail view of FIG. 2B.

The peak height of the exothermic and endothermic peaks increased proportionally with increasing heating rates, but the peak temperatures (Tp) were also significantly increased with increasing heating rates, as shown in FIG. 2A. The improved hydrogenation kinetics of the nanocomposite powders were further investigated by calculating the apparent $E_a$, using the Arrhenius approach (Equation 1 and FIG. 2C). Specifically, the $E_a$ of the hydrogenation reaction was determined by measuring Tp corresponding to different heating rates k and plotting ln(k) versus 1/Tp, as shown in FIG. 2C. A best linear fit was determined by a least-squares method. The data were well fit by a linear equation, and the $E_a$ of hydrogenation was obtained as the slope of the line (−E/R, where R is the gas constant). In particular, $E_a$ of the nanocomposite powder was found to be 23.61 kJ/mol, significantly lower than the 65 kJ/mol calculated for pure $MgH_2$ powders in the literature, indicating significantly improved hydrogenation kinetics upon doping $MgH_2$ with catalytic agents of $ZrNi_5$, $Nb_2O_5$, TiC and VC powders.

Figure 3A:
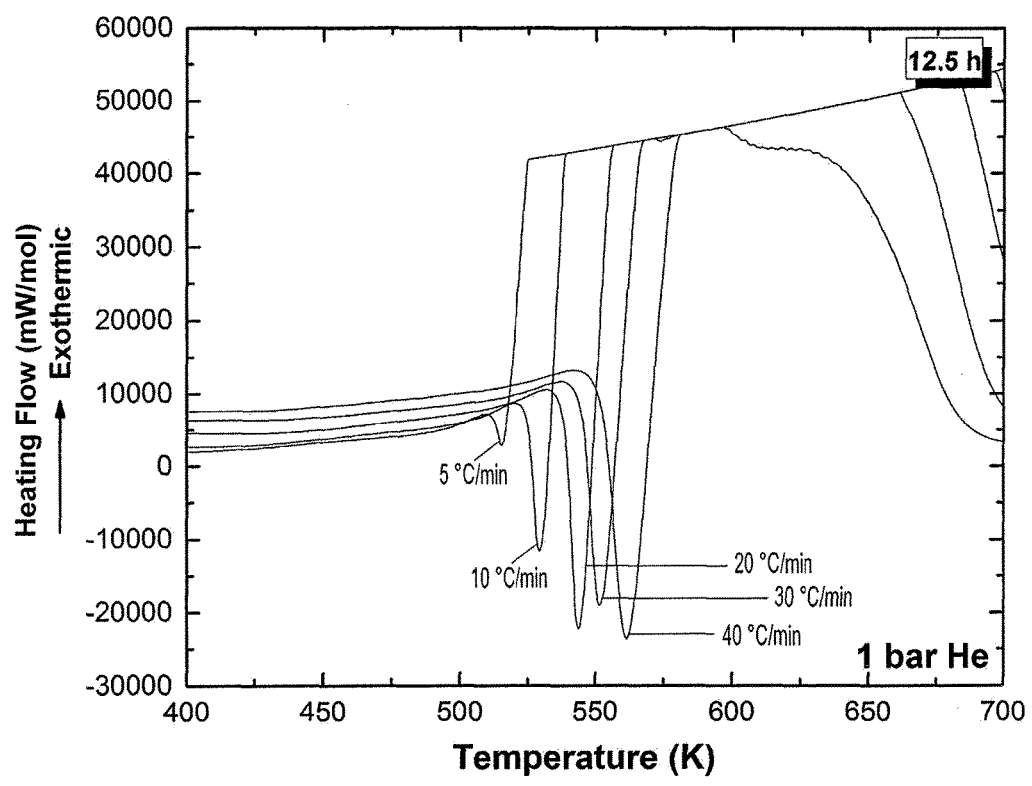
FIG. 3A is a plot of differential scanning calorimetry thermogram traces at various heating rates for $MgH_2$ doped with 4 wt. % $ZrNi_5$ and 1 wt. % $Nb_2O_5$+0.5 wt. % TiC+0.5 wt. % VC powder after 12.5 h of reactive ball milling time.
Figure 3B:
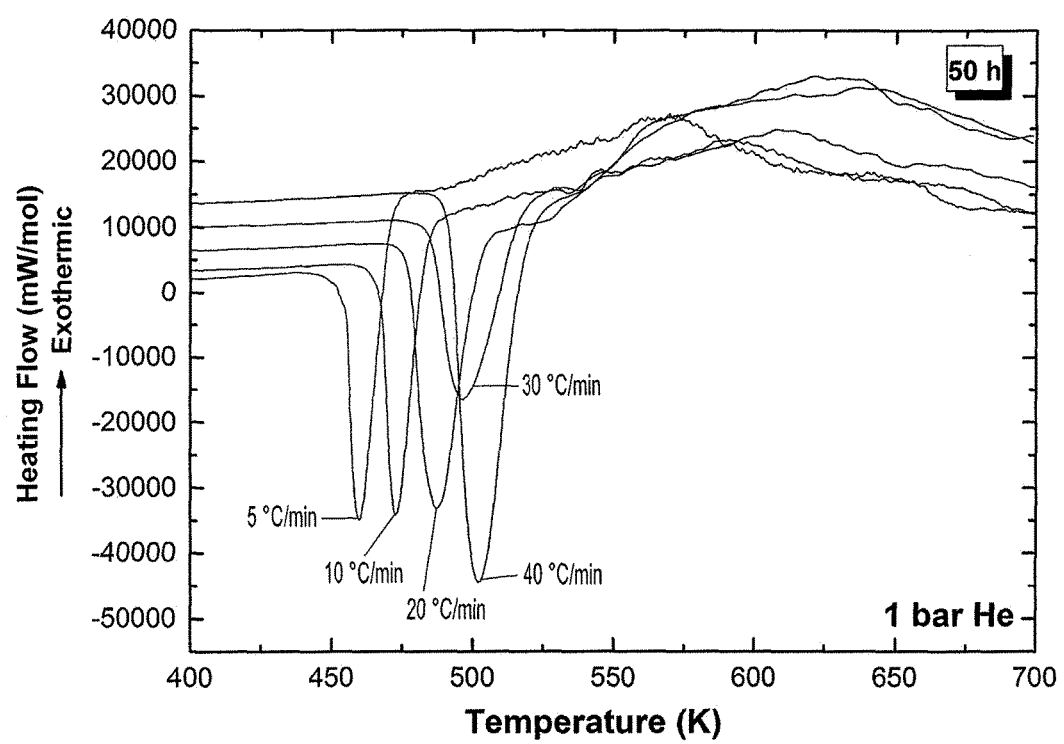
FIG. 3B is a plot of differential scanning calorimetry thermogram traces at various heating rates for $MgH_2$ doped with 4 wt. % $ZrNi_5$ and 1 wt. % $Nb_2O_5$+0.5 wt. % TiC+0.5 wt. % VC powder after 50 h of reactive ball milling time.

The thermal stabilities and apparent $E_a$ of decomposition for nanocomposite powders obtained after different RBM times were investigated by DSC performed at 1 bar atmospheric pressure of helium gas for different heating rates. FIG. 3A shows the DSC thermograms conducted at heating rates of 5, 10, 20, 30 and 40° C./min for the nanocomposite powders obtained after 12.5 h of RBM time, and FIG. 3B shows the DSC thermograms conducted at heating rates of 5, 10, 20, 30 and 40° C./min for the nanocomposite powders obtained after 50 h of RBM time. Peak temperature of decomposition is significantly decreased with increasing the RBM time. This trend can be further understood in the context of FIG. 4, which elucidates the effect of RBM time and the additive powders on destabilizing the $MgH_2$ phase.

Figure 4:
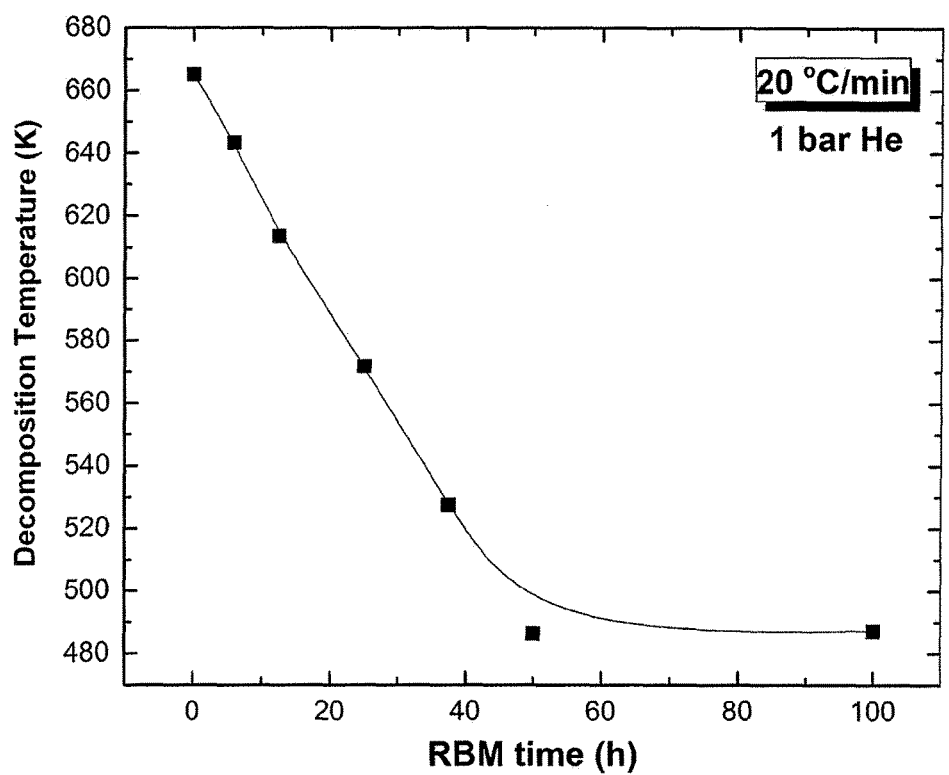
FIG. 4 is a plot of the decomposition temperature of $MgH_2$ doped with 4 wt. % $ZrNi_5$ and 1 wt. % $Nb_2O_5$+0.5 wt. % TiC+0.5 wt. % VC powder as a function of reactive ball milling (RBM) time.

In FIG. 4, the decomposition temperature of as-prepared nanocrystalline $MgH_2$ powders obtained after 200 h RBM time (about 665° C.) monotonically decreased after addition of the hard powders and increasing the milling time, ultimately approaching a lower decomposition of about 486° C. after only 50 h of RBM time. The decomposition temperature saturated at this value, even after RBM for 100 h, as shown in FIG. 4. The destabilization of $MgH_2$ upon doping with the hard powder particles of $Nb_2O_5$, TiC and VC and milling for a longer time (~50 h) leads to drastic decreasing in the particle size of $MgH_2$, since the additive powders can act as micro-scaled grinding media. In addition, RBM, together with such micro-scaled grinding media, can introduce a variety of defects, vacancies, dislocations, and stacking faults. All of these defects raise the free energy of the system, making accessible boundaries.

Figure 5:
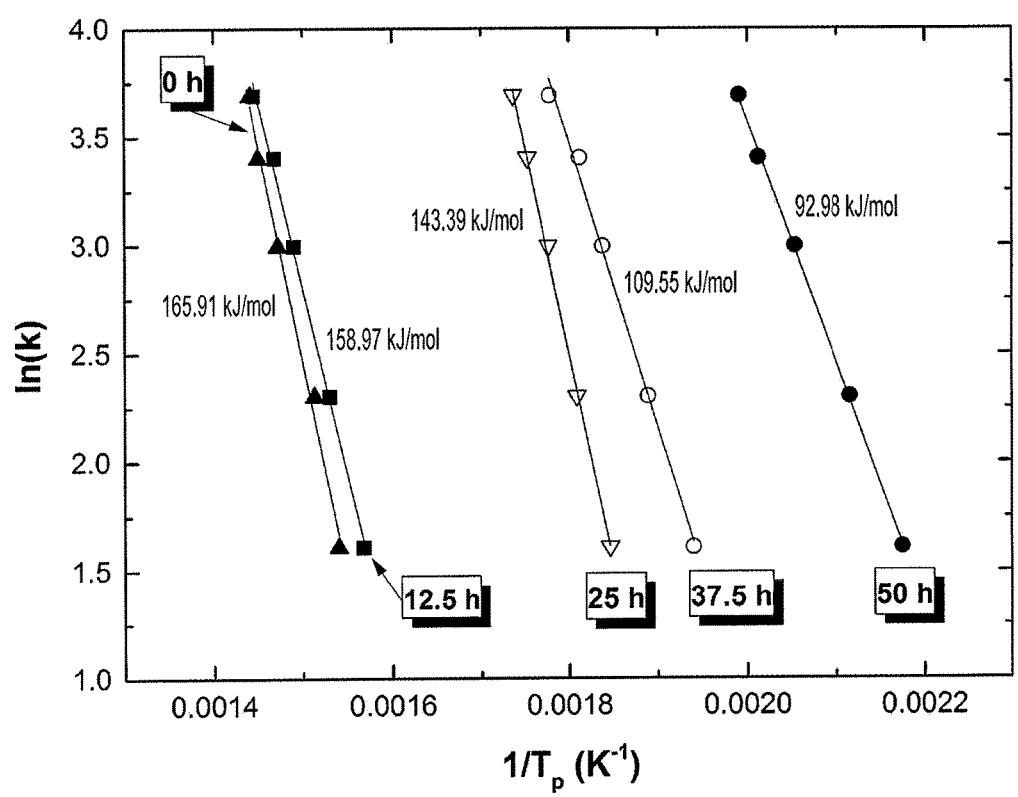
FIG. 5 is a plot showing the effect of increased RBM time on the activation energy ($E_A$) of $MgH_2$ doped with 4 wt. % $ZrNi_5$ and 1 wt. % $Nb_2O_5$+0.5 wt. % TiC+0.5 wt. % VC powder.

Lattice defects and imperfections lower the $E_a$ of decomposition, as indicated by the significant decrease of $E_a$ with increasing RBM time, as shown in FIG. 5. Initial $MgH_2$ powder has $E_a$ of 165.91 kJ/mol (FIG. 5). Doping with the additive powders and milling for further RBM time (50 h) drastically decreases the $E_a$ value, ultimately reaching 92.95 kJ/mol after 50 h RBM, as illustrated in FIG. 5.

Figure 6A:
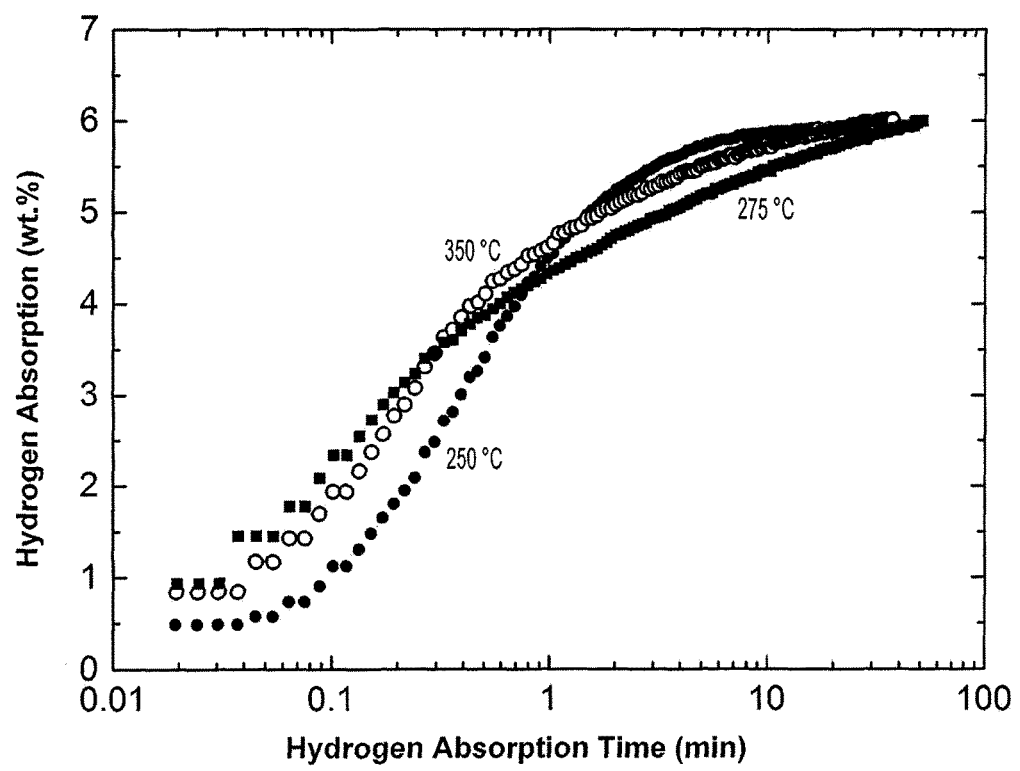
FIG. 6A is a plot of hydrogen absorption at various temperatures as a function of time for $MgH_2$ powders after 200 h RBM time.

The hydrogenation kinetics behavior of $MgH_2$ powder obtained after 200 h of RBM time is shown in FIG. 6A. The starting $MgH_2$ powder shows slow hydrogenation kinetics, indexed by the long time (60 min) required to absorb about 6 wt. % of $H_2$, even at high temperature (350° C.).

Figure 6B:
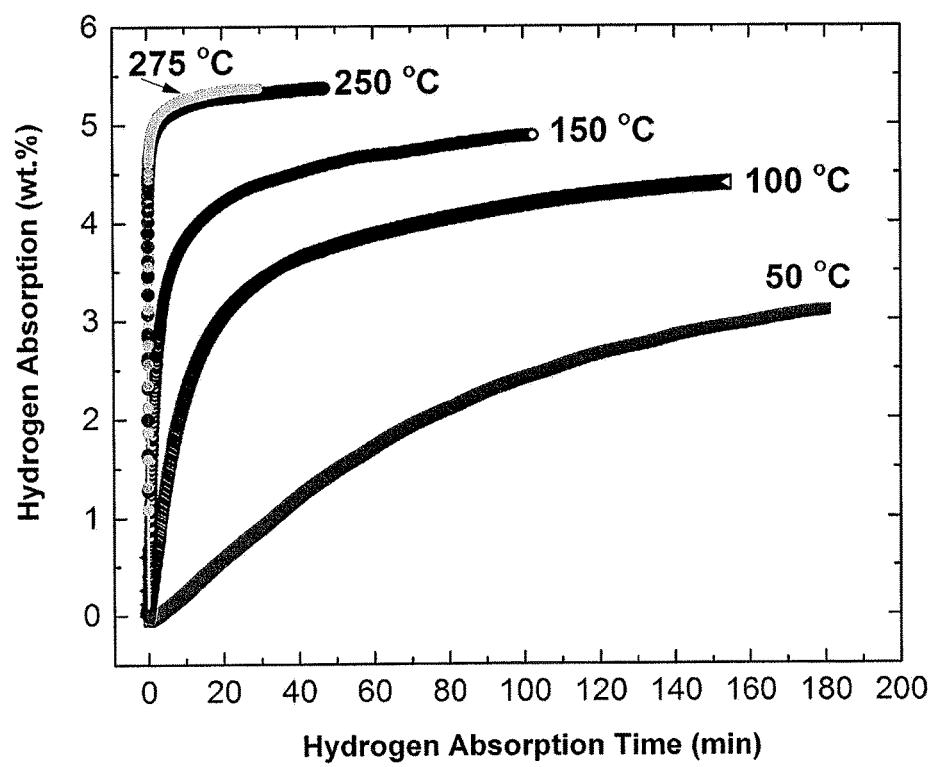
FIG. 6B is a plot of hydrogen absorption at various temperatures as a function of time for $MgH_2$ doped with 4 wt. % $ZrNi_5$ and 1 wt. % $Nb_2O_5$+0.5 wt. % TiC+0.5 wt. % VC powder after 50 h RBM time.

Doping the $MgH_2$ powders with the mixed catalytic agent powders and milling for 50 h led to outstanding improvements in the kinetics of hydrogenation, as shown in FIG. 6B. In general, the synthesized nanocomposite powders showed good potential for absorbing hydrogen gas in a wide temperature range (50° C. to 275° C.) with different hydrogen capacity, as demonstrated in FIG. 6B. After 0.5 min, the powders absorbed 4.6 wt. % $H_2$ at 250° C. and 275° C., but very little (0.8, 0.1 and 0.0 wt. % $H_2$) at 150° C., 100° C., and 50° C., respectively (FIG. 6B). After 1 minute, the powders absorbed significantly more $H_2$ (2.2, 3.8, 5.1 and 5.3 wt. % at applied temperatures of 100° C., 150° C., 250° C. and 275° C., respectively), as shown in FIG. 6B. Marginal improvement of the absorption kinetics was observed for the sample measured at 50"C, which absorbed only 0.2 wt. % $H_2$ after 1 min. Increasing the absorption time to 30 min did not significantly increase the absorbed amount of $H_2$ for the samples examined at 250° C. and 275° C., which tended to saturate at 5.3 wt. % $H_2$. An outstanding improvement in the hydrogen absorbed at 150° C. (4.4 wt. %) could be attained after 30 min and tended to increase to a higher value (4.9 wt. %) after 103.8 min (FIG. 6B). After 30 min, the samples examined at 100° C. and 50° C. absorbed about 3.4 and 0.9 wt. % $H_2$, as shown in FIG. 6B. The hydrogen concentrations of these samples reached to 4.2 and 2.5 wt. %, respectively, after 103.8 min. About 180 min was required for the samples measured at 100° C. and 50° C. to absorb 4.4 and 3.1 wt. % $H_2$.

Figure 7A:
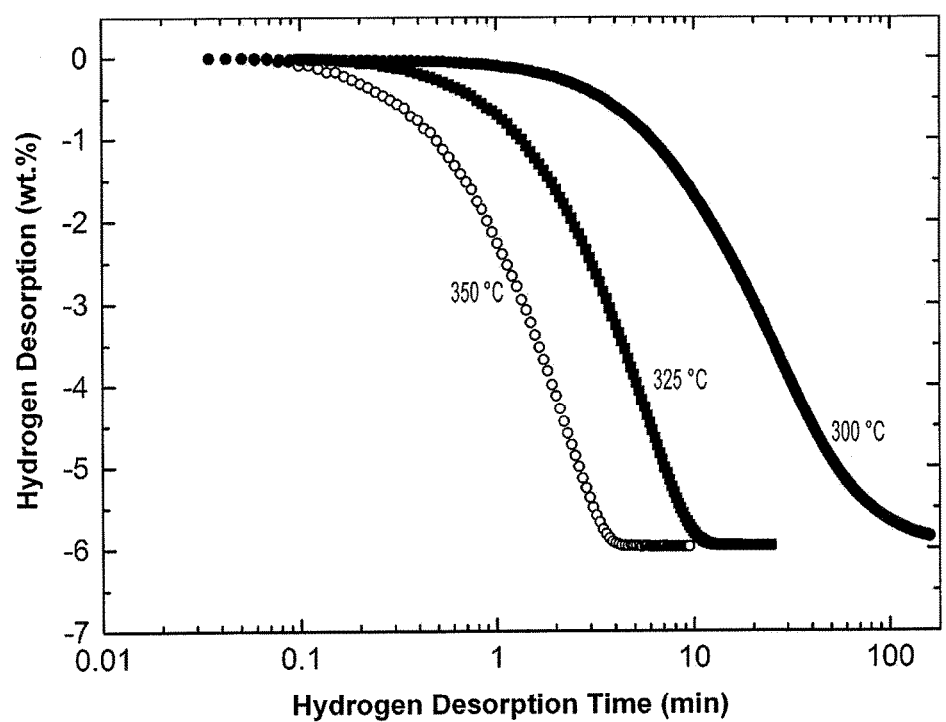
FIG. 7A is a plot showing the desorption of hydrogen from nanocrystalline $MgH_2$ powders obtained after 200 h of reactive ball milling (RBM) time as a function of time at various temperatures.
Figure 7B:
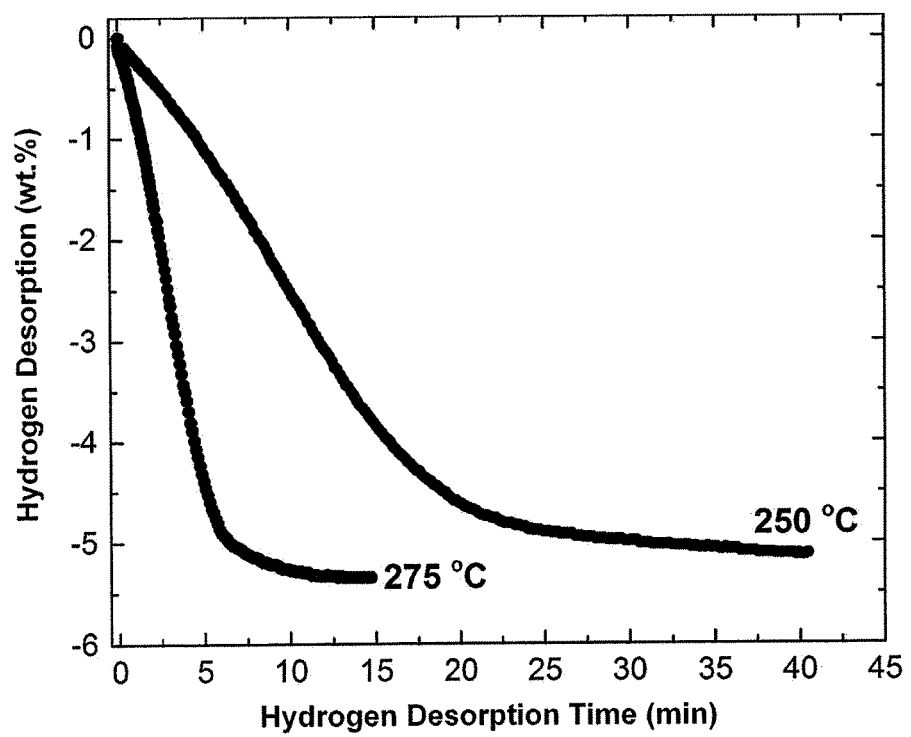
FIG. 7B is a plot showing the desorption of hydrogen from $MgH_2$ doped with 4 wt. % $ZrNi_5$ and 1 wt. % $Nb_2O_5$+0.5 wt. % TiC+0.5 wt. % VC powder after 50 h RBM time as a function of time at various temperatures.

FIG. 7A illustrates the dehydrogenation kinetics of $MgH_2$ powders obtained after 200 h of RBM time. The $MgH_2$ powders exhibit very slow kinetics at 300° C., indicated by the very long time needed to desorb about 6 wt. % $H_2$ (more than 100 min). Increasing the applied temperature to higher values of 325° C.–350° C. improved the desorption kinetics. FIG. 7B illustrates the dehydrogenation kinetics of the nanocomposite powders investigated at 250° C. and 275° C. The sample examined at 275° C. showed excellent desorption kinetics, indexed by the relatively short time (~5 min) required to release about −4.4 wt. % of hydrogen. A saturation value (−5.2 wt. % $H_2$) was reached after only 10 min. The sample measured at 250° C. releases about −1.1 and −2.4 wt. % $H_2$ after 5 and 10 minutes, respectively. After 15 min of desorption time, the samples examined at 275° C. and 250° C. had released about −5.3 and −3.8 wt. % $H_2$, respectively. About 40 min was required for the sample examined at 250° C. to desorb its full hydrogen storage capacity (−5.1 wt. % $H_2$).

Cycle-life-time characterizes the capability of metal hydrides to achieve continuous cyclic hydrogenation/dehydrogenation processes. The "cycle-life-time" is a measure of the number of times that hydride materials can be charged and discharged with hydrogen. Preferably, to be useful in hydrogen storage applications, a metal hydride should maintain hydrogen storage capacity over a cycle-life-time test. In addition, the powder should show stable hydrogenation/dehydrogenation kinetics without significant degradation.

Apart from improved hydrogenation/dehydrogenation kinetics discussed previously, the nanocomposite powder synthesized as described in Example 1 showed favorable cyclic-reversibility when examined at 275° C. under repeated hydrogenation/dehydrogenation pressure of 100 mbar/8 bar. The cycle-life-time at 275° C. for the nanocomposite powders obtained after 50 h of RBM time were tested as follows. First, the powders were activated by applying cyclic hydrogen gas sorption/desorption under pressure of 35 bar at 350° C. for 10 continuous cycles. This treatment is necessary for surface cleaning of the powders and to break down the oxide phase (Mg) formed on the powder surfaces. The nanocomposite powder then exhibited excellent cyclic-reversible behavior, in particular, high cyclic stability without failure or degradation of kinetics and hydrogen storage, even after about 300 h.

During the first few hydration/dehydration cycles (<25 h), the ductile Mg powder presumably overcame permanent expansion and size change upon removal of the applied pressure, which dropped from 8 bar (absorption mode) to 100 mbar (desorption mode) for each cycle. Cyclic repetitions of the load at an applied temperature of 275° C. (0.42 of the Mg melting point) led to softening of Mg powder particles and a decrease in hardness, resulting in permanent deformation (expansion) of the powders. Accordingly, after about 300 h of the cycle-life-time, the powders tended to lose their original hydrogen storage capacity (i.e., to absorb/desorb hydrogen), which was about 5.0 wt. % $H_2$. Marginal degradation in the hydrogen storage capacity was detected when the cyclic time reached around 300 h.

Comparing the number of cycles achieved at 275° C. by the present nanocomposite system with existing systems, including $MgH_2/Mn_{3.6}Ti_{2.4}$, 1000 cycles/275° C. (Calka, 1991), $MgH_2$/10 big-cube $Zr_2Ni$, 2546 cycles/250° C. (Sorensen, 2005) and $MgH_2$/5Fe, 47 cycles/300° C. (Principi et al., 2009) systems, the present system is among the most reliable and capable MgH$_2$-based nanocomposite systems for use in hydrogen storage applications.

In summary, the presently disclosed nanocomposite system and method of fabricating the nanocomposite powder allow for decreasing the high temperature (350-400° C.) required for hydrogenation/dehydrogenation processes by other MgH$_2$ systems, for improving the kinetics of hydrogen gas absorption/desorption, for ensuring a high performance of cycle-life-time of at least 300 h, and for limiting the tendency of Mg grains from growing upon experiencing several tens of cycle-life-time under high pressure and temperature.

It is to be understood that the present invention is not limited to the embodiments described above, but encompasses any and all embodiments within the scope of the following claims.

We claim:

1. A nanocomposite system for solid hydrogen storage, comprising a nanocrystalline powder mixture of magnesium hydride (MgH$_2$) doped with a catalyst for improving hydrogenation and dehydrogenation properties of the MgH$_2$, the catalyst including ZrNi$_5$, Nb$_2$O$_5$, titanium carbide (TiC) and vanadium carbide (VC).

2. The nanocomposite system for solid hydrogen storage as recited in claim 1, wherein the nanocrystalline powder mixture comprises:
   4 wt % ZrNi$_5$;
   1 wt % Nb$_2$O$_5$;
   0.5 wt % TiC;
   0.5 wt % VC;
   the balance being MgH$_2$.

3. The nanocomposite system for solid hydrogen storage as recited in claim 1, wherein the magnesium hydride and the catalyst are mixed mechanically by reactive ball milling to form the nanocrystalline powder.

4. The nanocomposite system for solid hydrogen storage as recited in claim 1, wherein the MgH$_2$ comprises nanocrystalline β-MgH$_2$ powder.

5. The nanocomposite system for solid hydrogen storage as recited in claim 1, wherein the ZrNi$_5$ powder comprises ZrNi$_5$ in Friauf-Laves phase crystalline structure.

6. The nanocomposite system for solid hydrogen storage as recited in claim 1, wherein nanocrystalline powder mixture have a particle size between 5-12 nm.

* * * * *